Sheet 2

William J Hooper, Theodore Hooper & Orazio Lugo

Improved Kiln for drying fish & other substances

99673                                   PATENTED FEB 8 1870

Witness
Jas Kelly
Will Shipley

Inventor
William J Hooper
Theodore Hooper
Orazio Lugo

United States Patent Office.

WILLIAM J. HOOPER, THEODORE HOOPER, AND ORAZIO LUGO, OF BALTIMORE, MARYLAND.

Letters Patent No. 99,673, dated February 8, 1870.

---

IMPROVEMENT IN APPARATUS FOR DRYING FISH AND OTHER SUBSTANCES.

---

The Schedule referred to in these Letters Patent and making part of the same.

---

*To whom it may concern:*

Be it known that we, WILLIAM J. HOOPER, THEODORE HOOPER, and ORAZIO LUGO, of the city of Baltimore, and State of Maryland, have invented certain Improvements in Kilns for Drying Fish, and other Substances, animal or vegetable, of which the following is the specification.

The nature of our invention consists in a drying-kiln, wherein fish or other substances, animal or vegetable, are placed in a basket or baskets, made either of rods of iron or perforated iron pipes, arranged and connected with a main pipe or pipes, for the introduction of heated air, or other gases.

The cover or top of the kiln has a perforated false top or perforated pipes, for the introduction of heated air or other gases, and vapors of hydrocarbons when such hydrocarbons are required during the operation of drying fish, or other substances, animal or vegetable, for the purpose hereafter more fully specified.

Reference being had to the accompanying letters of the drawing—

Figure 1:
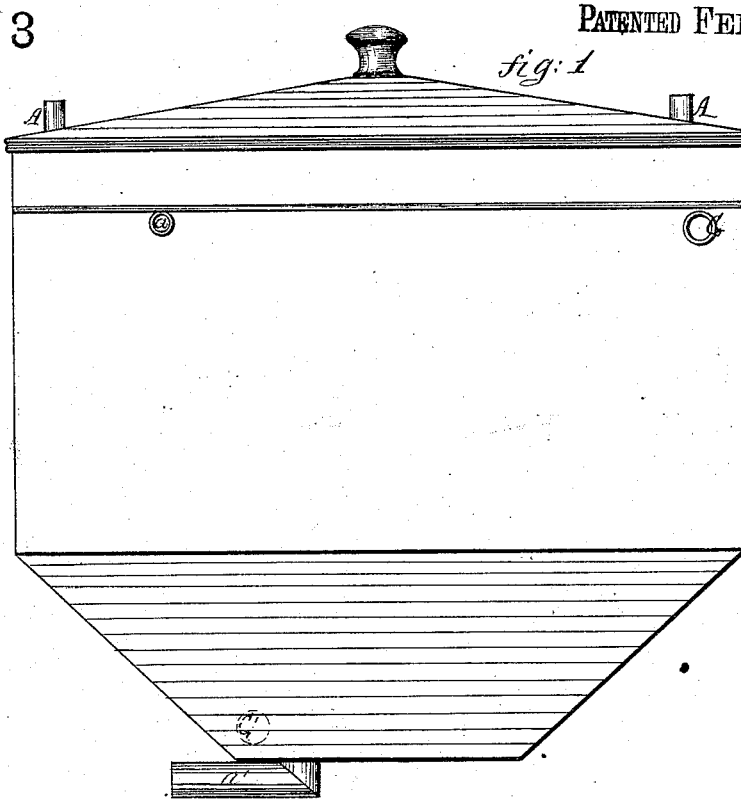
Figure 1 is a front view of the kiln.

In fig. 1—

A is an air-pipe, connecting with the false top of the cover of the kiln.

*a*, is another air-pipe connecting with the basket B.

*a'* is an exhaust air-pipe, taking the air either from A or *a*.

B is a basket, made of perforated pipes, showing how it is suspended in the kiln.

C is the bottom of the basket B, made of rods or perforated pipes, attached to the basket B by hinges.

The kiln has a jacket, *f*, where steam or heated gases are introduced at G, and exhausted at G'.

D is a drop-door.

Figure 2:
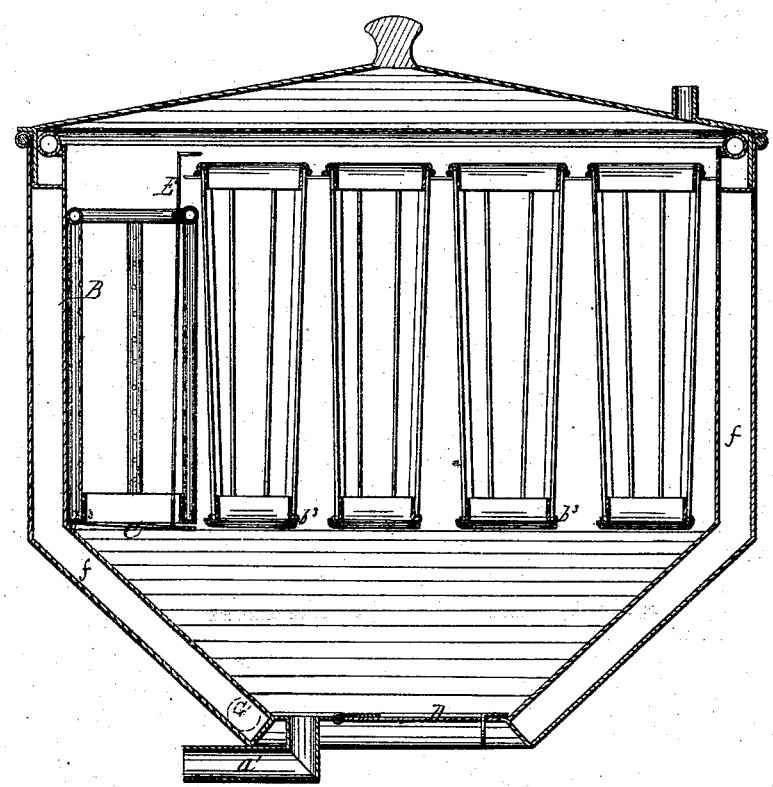
Figure 2 is a longitudinal vertical section, showing two forms of baskets, either of which may be used.

In fig. 2—

B is a basket, made of perforated pipes.

*a* is a main pipe, connecting with all the perforated pipes of the basket.

*c* is the bottom of the basket, made of iron rods or perforated pipes, and attached to the basket by hinges at $b^3$.

E is a rod, by means of which the bottom of the basket may be dropped or raised.

In order to enable others to work and apply our invention, we will proceed to describe the operation.

The kiln being opened, by removing the cover or top, thus exposing the basket or baskets, the fish or other substances, animal or vegetable, to be dried by air or other heated gases, are placed in the basket or baskets B B B, &c., and the cover or top replaced.

Steam or heated gases are turned on at G into the jacket of the kiln, and let exhaust at G'.

The air-pipe A, or *a*, is connected with a pump or blower, and either hot air or gases from the combustion of fuel in a furnace are introduced. The heated gases or air come out from the holes of the perforated pipes, which the basket or baskets are made of or from the perforated false top of the cover of the kiln, take up the moisture of the fish, or whatever other substances may be placed in the basket or baskets, and carry it off at *a'*.

When the fish or other matter is sufficiently dry, the cover of the kiln is taken off, the bottom of the basket or baskets dropped by means of the rod E, and the fish or other matter is let down at the bottom of the kiln, and taken out at the door D.

What we claim as our invention, and desire to secure by Letters Patent of the United States, is—

1. A kiln, by which the fish or other substances, animal or vegetable, are kept separated, by perforated pipes, wire, or their equivalents, in order that the air or other heated gases may readily come in contact with the substances above mentioned, for the purpose set forth.

2. The basket or baskets herein described, with movable bottom, substantially for the purpose set forth.

3. The top or cover of the kiln, with a perforated false top or perforated pipes, as herein described.

4. The door D of the kiln, for the purpose as herein described.

5. The kiln with a steam or heated gases jacket for the purpose of controlling the heated air or gases in the kiln itself.

WILLIAM J. HOOPER.
THEODORE HOOPER.
ORAZIO LUGO.

Witnesses:
F. M. SHIFLEY,
JAS. KELLEY.